US007916136B2

(12) United States Patent
Yang et al.

(10) Patent No.: US 7,916,136 B2
(45) Date of Patent: Mar. 29, 2011

(54) TIMING CONTROLLERS AND DRIVING STRENGTH CONTROL METHODS

(75) Inventors: Yu-Chu Yang, Tainan County (TW); Ching-Wen Wang, Tainan County (TW)

(73) Assignee: Himax Technologies Limited, Sinshih Township, Tainan County (TW)

(*) Notice: Subject to any disclaimer, the term of this patent is extended or adjusted under 35 U.S.C. 154(b) by 867 days.

(21) Appl. No.: 11/847,385

(22) Filed: Aug. 30, 2007

(65) Prior Publication Data

US 2009/0058479 A1 Mar. 5, 2009

(51) Int. Cl.
*G06F 3/038* (2006.01)

(52) U.S. Cl. .......................... 345/213; 345/207; 345/211

(58) Field of Classification Search ............ 345/87–100, 345/211–213, 207; 327/100, 291
See application file for complete search history.

(56) References Cited

U.S. PATENT DOCUMENTS

| | | | | |
|---|---|---|---|---|
| 5,900,854 | A * | 5/1999 | Itoh et al. | 345/99 |
| 6,466,192 | B2 * | 10/2002 | Imamura | 345/98 |
| 6,483,497 | B1 * | 11/2002 | Iino et al. | 345/100 |
| 7,142,200 | B2 * | 11/2006 | Yamagishi et al. | 345/204 |
| 2005/0017965 | A1 * | 1/2005 | Morita et al. | 345/211 |
| 2006/0192598 | A1 * | 8/2006 | Baird et al. | 327/100 |
| 2007/0296668 | A1 * | 12/2007 | Kim et al. | 345/89 |
| 2008/0012809 | A1 * | 1/2008 | Kim et al. | 345/87 |

* cited by examiner

*Primary Examiner* — Kimnhung Nguyen
(74) *Attorney, Agent, or Firm* — Thomas | Kayden

(57) ABSTRACT

A timing controller receiving image data using an input clock signal and transferring the received image data and an output clock signal to a source driver. The received image data is transferred to the source driver through an output buffer. A frequency detection circuit detects a frequency of the input clock signal. A power supply circuit provides power to the output buffer, wherein power level is determined by the detected frequency.

20 Claims, 6 Drawing Sheets

TIMING CONTROLLERS AND DRIVING STRENGTH CONTROL METHODS

BACKGROUND OF THE INVENTION

1. Field of the Invention

The invention relates to timing controllers for a liquid crystal display (LCD), and more particularly to timing controllers adjusting the driving strength of an output buffer.

2. Description of the Related Art

Generally, a liquid crystal display (LCD), which includes two panels with respective polarizers and a liquid crystal layer with dielectric anisotropy disposed therebetween, displays desired images by application of electric field to the liquid crystal layer to control the amount of light passing through the panels. The LCD includes a plurality of pixels arranged in a matrix, a plurality of gate lines transmitting gate signals to the pixels and extending in a row direction, and a plurality of data lines transmitting data signals to the pixels and extending in a column direction. Each pixel includes a liquid crystal capacitor and a switching element connected thereto, and the liquid crystal capacitor has a pixel electrode and a reference electrode generating electric field in cooperation and a liquid crystal layer interposed therebetween. Each switching element is connected to one gate line and one data line to be turned on or turned off in response to the gate signal, thereby transmitting the data signal to the pixel electrode. The magnitude of the electric field applied to the liquid crystal layer depends on the difference between the voltage of a reference signal (hereinafter, referred to as a reference voltage) applied to the reference electrode and the voltage of the data signal (hereinafter, referred to as a data voltage). The reference electrode and the pixel electrode may be formed on the same panel or different panels.

When gate-on voltages are sequentially applied to the gate lines, the switching elements connected thereto are turned on. At the same time, the data lines connected to the turned-on switching elements are applied with appropriate data voltages, which are applied to the respective pixel electrodes in a pixel row via the turned-on switching elements. In this manner, the gate-on voltages are applied to all the gate lines to supply the data voltages to the pixels in all the rows, such a cycle being referred to as a frame.

The timing controller is supplied from an external graphic controller with RGB color signals and timing signals controlling the display thereof, for example, vertical synchronizing signals, horizontal synchronizing signals, a clock signal, a data enable signal, etc. In response to the timing signals, the timing controller sends gate control signals to the gate driver, and the RGB color signals and data control signals to the source driver.

To avoid signal attenuation, the conventional timing controller outputs driving signals such that the gate control signals, clock and the RGB color signals have a fixed driving strength according to the loading of the circuit to be driven. However, the driving strength designed for the driving signals with high frequency may not be applicable with that of low frequency. For example, the optimum driving strength selected for the driving signal with low frequency may not enough for that with high frequency. Similarly, the optimum driving strength selected for the driving signal with high frequency may cause problems of overshoot, crosstalk, and even electromagnetic interference when applied to that with low frequency.

BRIEF SUMMARY OF INVENTION

Timing controllers and driving strength control methods are provided. An exemplary embodiment of a timing controller receiving image data using an input clock signal and transferring the received image data to a source driver comprises an output buffer through which the received image data is transferred to the source driver, a frequency detection circuit detecting a frequency of the input clock signal, and a power supply circuit providing power to the output buffer, wherein the amount of power is determined by the detected frequency.

Another exemplary embodiment of a timing controller receiving image data using an input clock signal and transferring the received image data to a source driver comprises an output buffer through which the received image data is transferred to the source driver, a frequency detection circuit detecting a frequency of the input clock signal, and a power supply circuit comprising a variable current source providing an output current to the output buffer according to the frequency of the input clock signal.

An exemplary embodiment of a driving strength control method for a timing controller comprises receiving image data from a display card using an input clock signal, detecting a frequency of the input clock signal, providing an output current to an output buffer according to the frequency of the input clock signal, transferring the received image data to a source driver through the output buffer.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
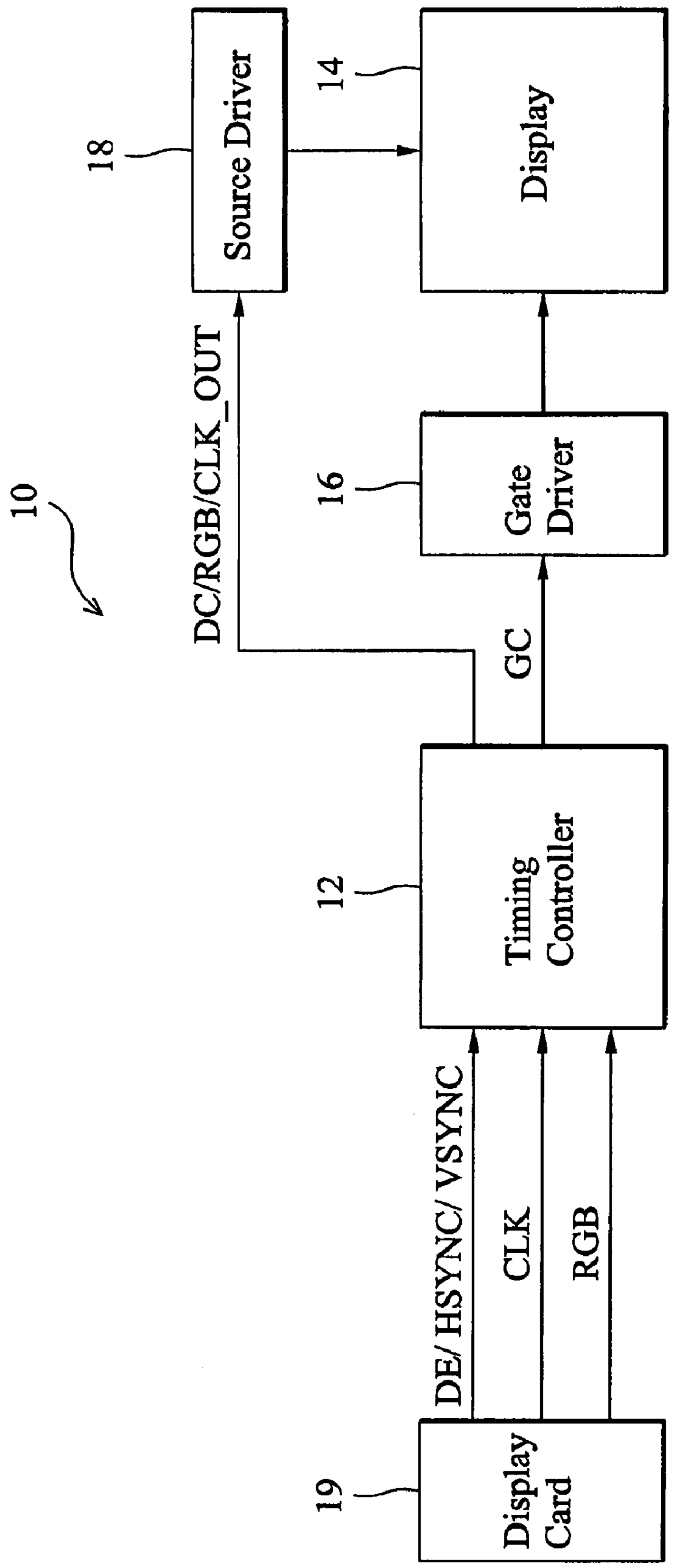
FIG. 1 is a block diagram of a display system 10 according to an embodiment of the invention.

FIG. 1 is a block diagram of a display system 10 according to an embodiment of the invention. Timing controller 12 receives image data RGB, and timing signals controlling the display thereof, for example, vertical synchronizing signals VSYNC, horizontal synchronizing signals HSYNC, a clock signal CLK, and a data enable signal DE, etc. Note that the signal format transmitted to timing controller 12 shown in FIG. 1 is transistor-transistor logic (TTL) format. However, the signal format transmitted to timing controller 12 can be low-voltage differential signaling (LVDS) format as well. In response to the timing signals, timing controller 12 sends gate control signals GC to gate driver 16, and image data RGB, output clock CLK_OUT and data control signals DC to source driver 18. Here, image data RGB and clock signal CLK can be provided by an external device, such as a display card 19, and output clock CLK_OUT is generated according to the clock signal CLK with a predetermined phase difference therebetween.

Figure 2:
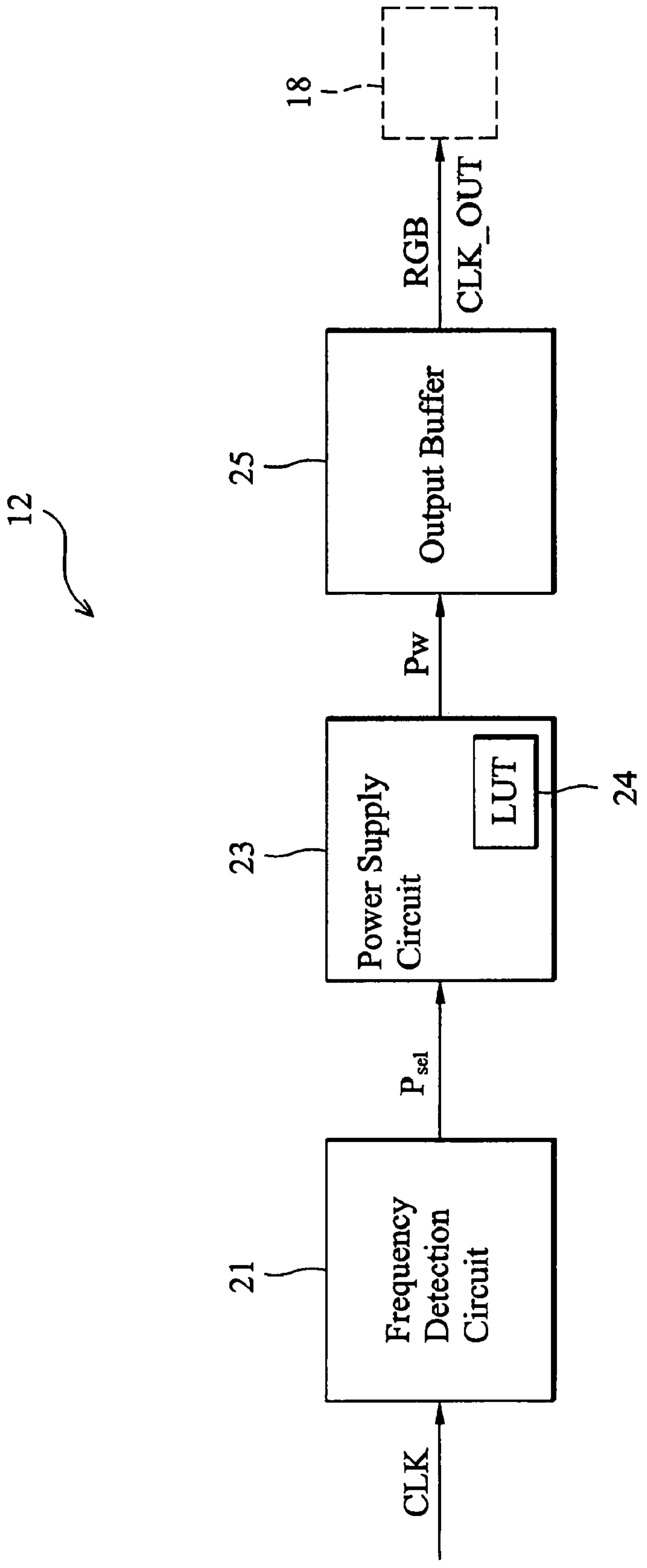
FIG. 2 is a block diagram of timing controller 12 according to an embodiment of the invention.

In order to provide image data RGB and output clock CLK_OUT with a suitable driving strength, timing controller 12 according to an embodiment of the invention adjusts the driving strength of image data RGB and output clock CLK_OUT in response to clock signal CLK. FIG. 2 is a block diagram of timing controller 12 according to an embodiment of the invention. A frequency detection circuit 21 detects a frequency Fc of the input clock signal CLK. A power supply circuit 23 supplies power Pw to the output buffer 25. Here, the amount of power Pw is determined by the detected frequency Fc. An output buffer 25 transfers image data RGB and output clock CLK_OUT to source driver 18. Note that the driving strength of image data RGB and output clock CLK_OUT is determined according to power Pw supplied from power supply circuit 23.

Figure 3:
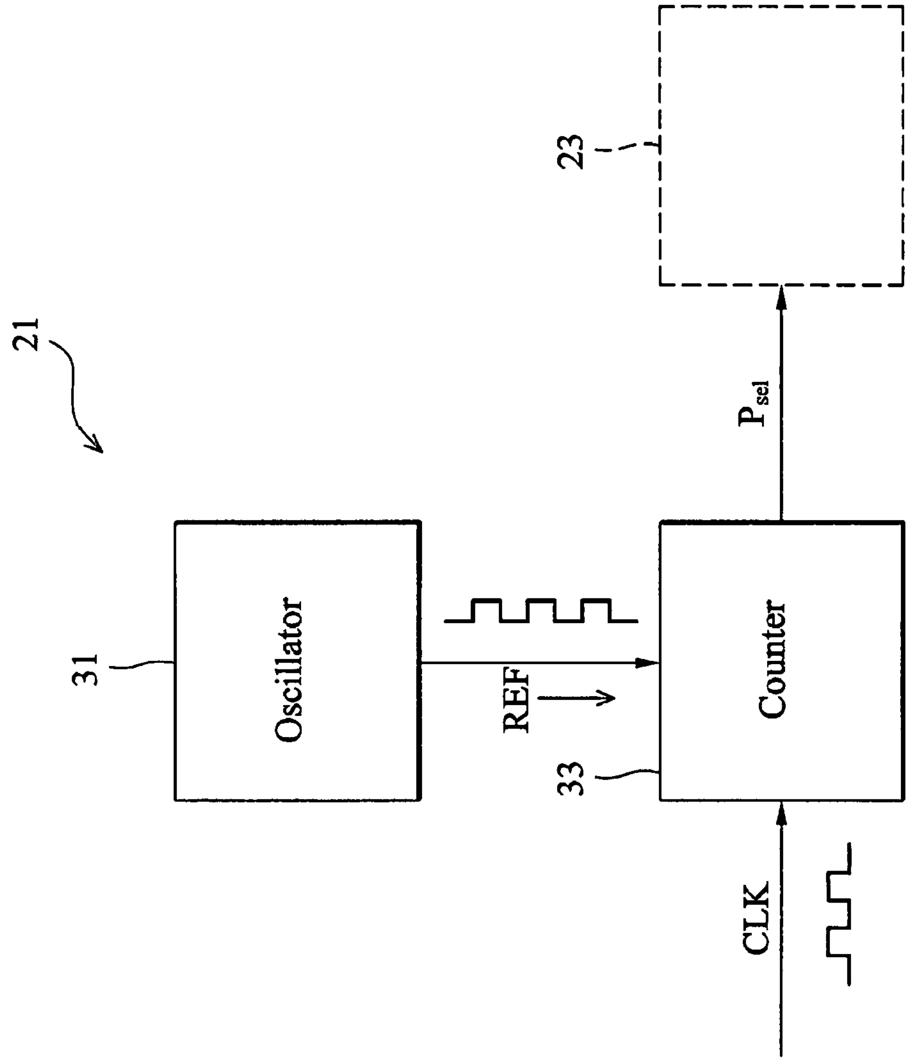
FIG. 3 is a block diagram of frequency detection circuit 21 according to an embodiment of the invention.

In an embodiment of the invention, frequency detection circuit 21 detects the frequency of the input clock signal CLK, and generates a power selection signal $P_{sel}$ according to a frequency ratio of a reference clock signal and input clock signal CLK. FIG. 3 is a block diagram of frequency detection circuit 21 according to an embodiment of the invention. An internal oscillator 31 provides a reference clock signal REF with a predetermined frequency. The frequency of reference clock signal REF is between about 30 MHz~80 MHz. Note that the internal oscillator 31 can be a local oscillator in the conventional timing controller. A counter 33 obtains a frequency ratio of the predetermined frequency and the frequency of input clock signal CLK, and outputs the power selection signal $P_{sel}$ according to the detected frequency ratio. In this embodiment, the frequency ratio can be obtained by initializing counter 33 using the rising edges of input clock signal CLK, and counter 33 is triggered by the rising edges of reference clock signal REF. Thus, rising edge number of reference clock signal REF between adjacent rising edges of input clock signal CLK, which is the frequency ratio, is obtained. The larger frequency ratio represents that the frequency of input clock signal CLK is lower than the smaller one.

Figure 4:
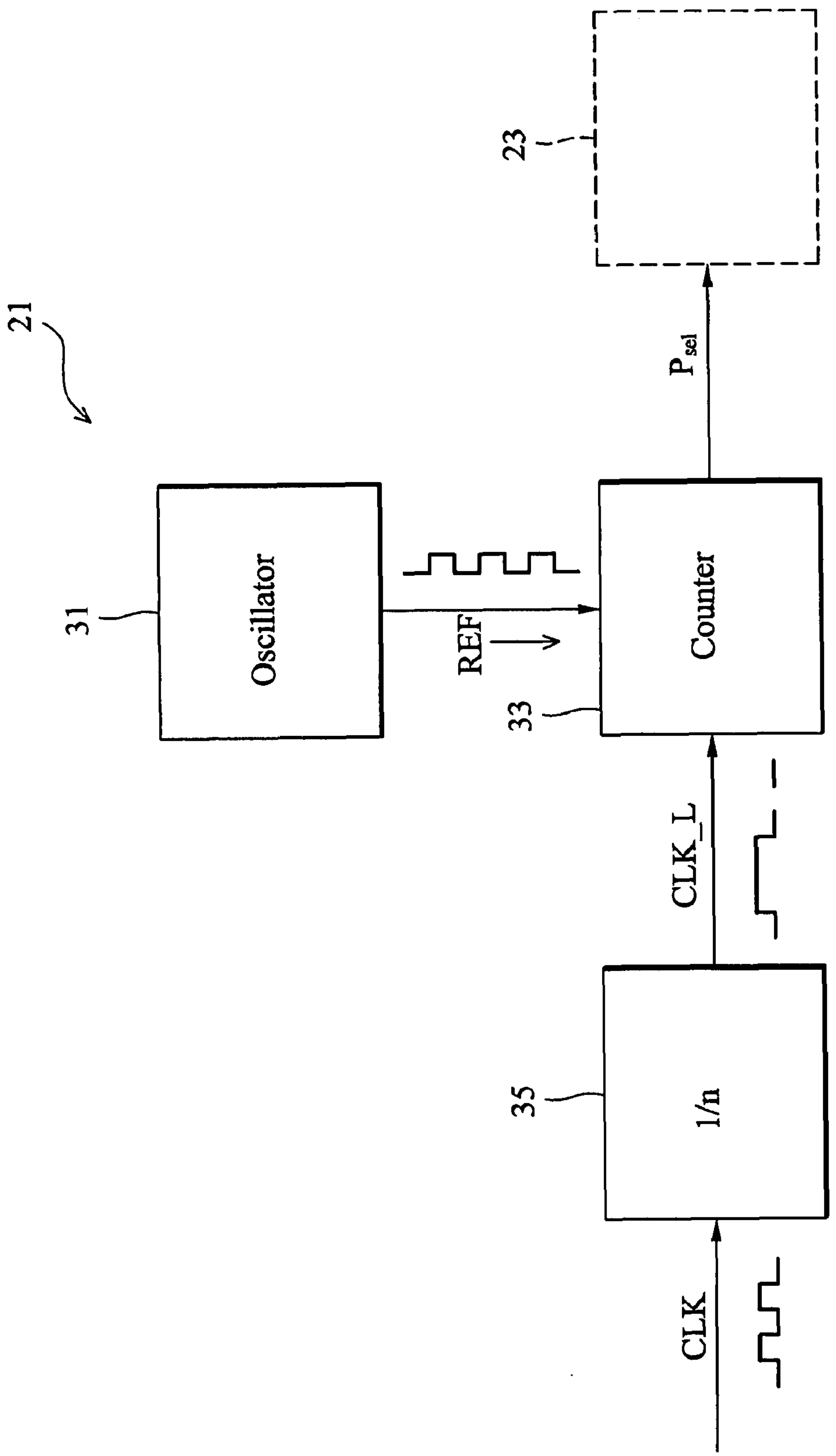
FIG. 4 is a block diagram of frequency detection circuit 21 according to another embodiment of the invention.

FIG. 4 is a block diagram of frequency detection circuit 21 according to another embodiment of the invention, differing from that shown in FIG. 3 in that a frequency divider 35 is added to reduce frequency of input clock signal CLK. The clock signal CLK_L divided by frequency divider 35 has a lower frequency. Thus, the frequency of reference clock signal REF provided by internal oscillator 31 can be decreased while using the clock signal CLK_L with decreased frequency.

Power supply circuit 23 supplies power Pw to the output buffer 25 according to power selection signal $P_{sel}$. In an embodiment of the invention, power supply circuit 23 comprises a lookup table (LUT) 24 storing the information of the power provided to the output buffer 25 corresponding to power selection signal $P_{sel}$. In the embodiments, the power selection signal $P_{sel}$ is generated according to the frequency ratio of the predetermined frequency and the frequency of input clock signal CLK. Thus, a specific power corresponding to power selection signal $P_{sel}$ can be obtained from the lookup table 24. Specifically, the power provided to output buffer 25 is relatively low when power selection signal $P_{sel}$ corresponds to the clock signal CLK with low frequency, and is relatively high when power selection signal $P_{sel}$ corresponds to the clock signal CLK with high frequency.

Figure 5:
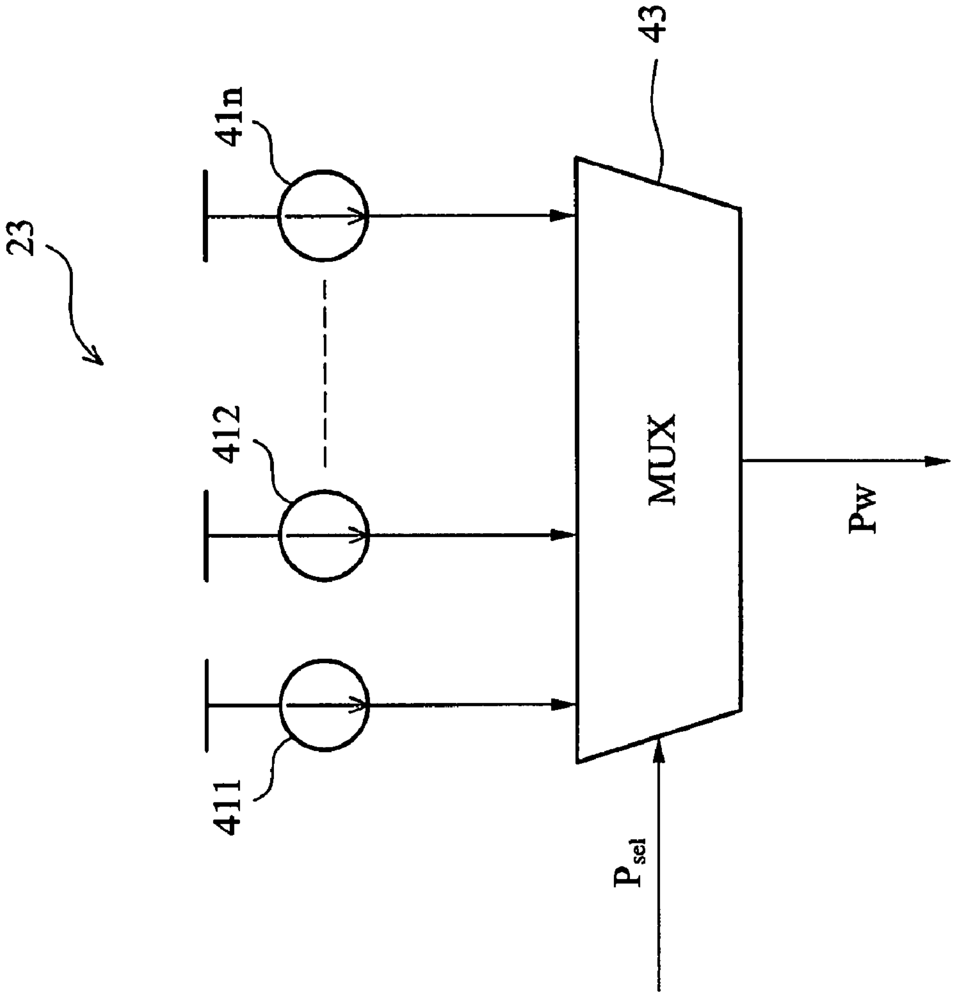
FIG. 5 is a block diagram of power supply circuit 23 according to another embodiment of the invention.

In an embodiment of the invention, power supply circuit 23 comprises a variable current source for generating an output current to the output buffer according to power selection signal $P_{sel}$. FIG. 5 is a block diagram of power supply circuit 23 according to another embodiment of the invention. Power supply circuit 23 comprises a plurality of current sources (411~41*n*) respectively providing a predetermined current with different current value according to power selection signal $P_{sel}$. A multiplexer 43 receives the currents from current sources (411~41*n*) and selectively outputs one to output buffer 25 according to power selection signal $P_{sel}$. Since output buffer 25 is applied by the selected current, image data RGB and output clock CLK_OUT output from output buffer 25 with corresponding driving strength are obtained.

Figure 6:
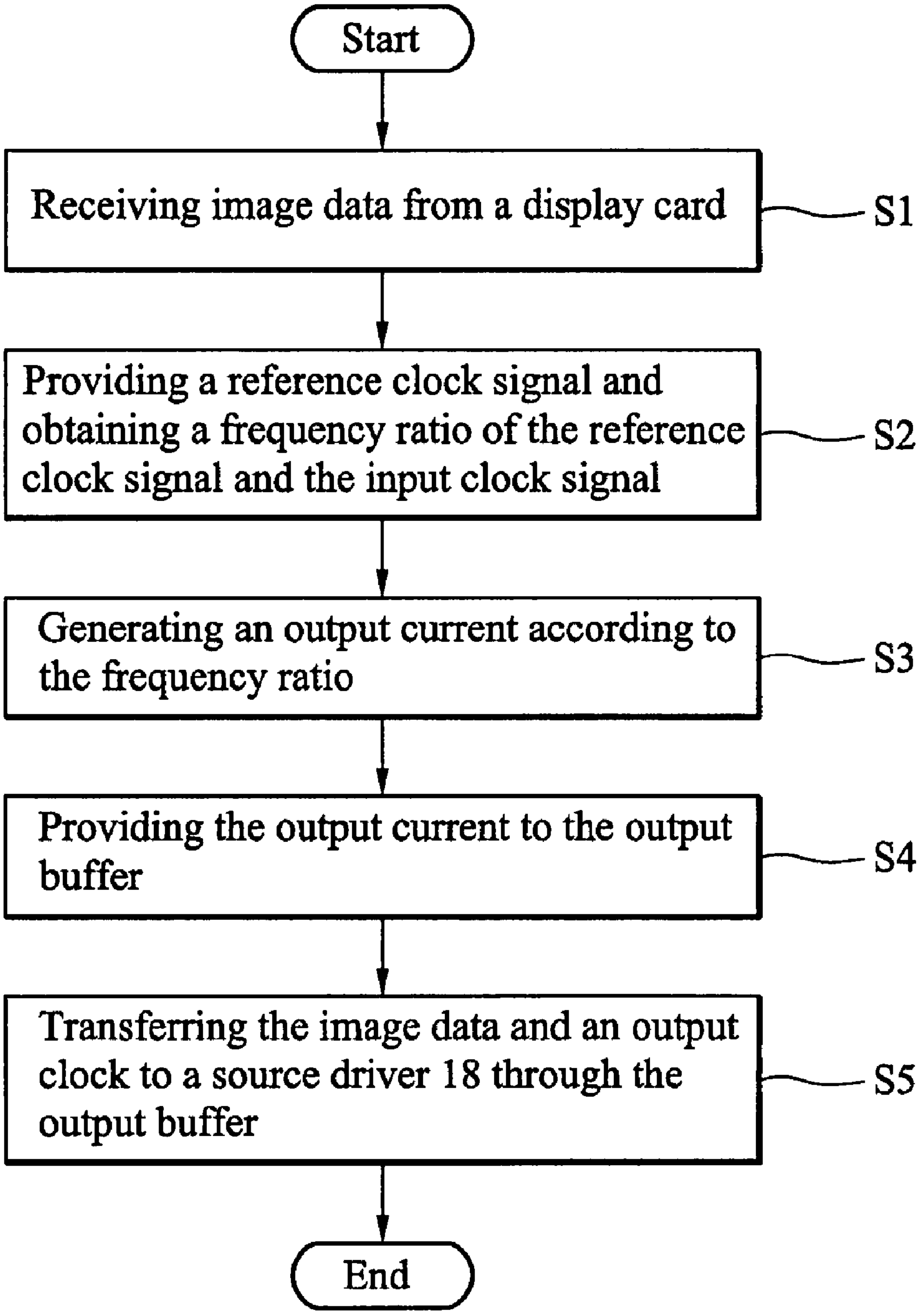
FIG. 6 is a flowchart of a driving strength control method according to an embodiment of the invention.

FIG. 6 is a flowchart of a driving strength control method according to an embodiment of the invention. The driving strength control method can be utilized in combination with display system 10 shown in FIG. 1. First, image data RGB is received from a display card 19 using an input clock signal CLK (S1). Next, a reference clock signal with a predetermined frequency is provided, and a frequency ratio of the predetermined frequency and the frequency of the input clock signal CLK is obtained (S2), wherein the frequency ratio is in inverse proportion to the frequency of the input clock signal CLK. Next, an output current is generated according to the frequency ratio (S3). Next, the output current is provided to the output buffer (S4). Finally, the image data RGB and output clock CLK_OUT are transferred to a source driver 18 through the output buffer (S5).

Accordingly, driving strength of the timing controller according to the embodiments of the invention is switched in response to the frequency changing of the clock signal input to the timing controller, ensuring the accuracy of the signal waveform provided to the source driver at different operating frequencies.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A timing controller receiving image data using an input clock signal and transferring the received image data and an output clock signal to a source driver, the timing controller comprising:

an output buffer through which the received image data and the output clock signal are transferred to the source driver;

a frequency detection circuit detecting a frequency of the input clock signal; and a power supply circuit providing power to the output buffer, wherein power level is determined by the detected frequency.

2. The timing controller as claimed in claim 1, wherein the frequency detection circuit comprises:

an internal oscillator providing a reference clock signal with a predetermined frequency; and a counter obtaining a frequency ratio of the predetermined frequency and the frequency of the input clock signal, wherein the power level is determined by the frequency ratio.

3. The timing controller as claimed in claim 1, wherein the frequency detection circuit comprises:

an internal oscillator providing a reference clock signal with a predetermined frequency;

a frequency divider decreasing the frequency of the input clock signal to generate a frequency divided signal; and a counter obtaining a frequency ratio of the predetermined frequency and the frequency of the frequency divided signal, wherein the power level is determined by the frequency ratio.

4. The timing controller as claimed in claim 1, wherein the power level is obtained from a lookup table according to the frequency of the input clock signal.

5. The timing controller as claimed in claim 1, wherein the power supply circuit comprises:

a plurality of current sources respectively providing a current with different current value; and a multiplexer receiving the currents and selectively outputting one of the current to the output buffer according to the frequency of the input clock signal.

6. The timing controller as claimed in claim 1, wherein the power supply circuit comprises a variable current source for generating an output current to the output buffer according to the frequency of the input clock signal.

7. The timing controller as claimed in claim 1, wherein the image data and the input clock signal are provided by a display card.

8. The timing controller as claimed in claim 1, wherein the output clock signal is generated according to the input clock signal.

9. A timing controller receiving image data using an input clock signal and transferring the received image data and an output clock signal to a source driver, the timing controller comprising:

an output buffer through which the received image data and the output clock signal are transferred to the source driver;

a frequency detection circuit detecting a frequency of the input clock signal; and a power supply circuit comprising a variable current source for providing an output current to the output buffer according to the frequency of the input clock signal.

10. The timing controller as claimed in claim 9, wherein the frequency detection circuit comprises:

an internal oscillator providing a reference clock signal with a predetermined frequency; and a counter obtaining a frequency ratio of the predetermined frequency and the frequency of the input clock signal.

11. The timing controller as claimed in claim 10, wherein the variable current source provides the output current according to the frequency ratio.

12. The timing controller as claimed in claim 9, wherein the frequency detection circuit comprises:

an internal oscillator providing a reference clock signal with a predetermined frequency;

a frequency divider decreasing the frequency of the input clock signal to generate a frequency divided signal; and a counter obtaining a frequency ratio of the predetermined frequency and the frequency of the frequency divided signal.

13. The timing controller as claimed in claim 12, wherein the variable current source provides the output current according to the frequency ratio.

14. The timing controller as claimed in claim 9, wherein the output current is obtained from a lookup table according to the frequency of the input clock signal.

15. The timing controller as claimed in claim 9, wherein the variable current source comprises:

a plurality of current sources respectively providing a current with different current value; and a multiplexer receiving the currents and selectively outputting one of the current to be the output current according to the frequency of the input clock signal.

16. The timing controller as claimed in claim 9, wherein the image data and the input clock signal are provided by a display card.

17. The timing controller as claimed in claim 9, wherein the output clock signal is generated according to the input clock signal.

18. A driving strength control method of a timing controller, comprising:

receiving image data from a display card using an input clock signal;

detecting a frequency of the input clock signal;

providing an output current to an output buffer according to the frequency of the input clock signal; and transferring the received image data and an output clock signal to a source driver through the output buffer.

19. The driving strength control method as claimed in claim 18, further comprising:

providing a reference clock signal with a predetermined frequency;

obtaining a frequency ratio of the predetermined frequency and the frequency of the input clock signal; and generating the output current according to the frequency ratio.

20. The driving strength control method as claimed in claim 18, further comprising obtaining the output current from a lookup table according to the frequency of the input clock signal.

* * * * *